Jan. 13, 1953  E. B. ATKINSON  2,625,357

BAR HANGER ATTACHMENT

Filed Feb. 27, 1946

INVENTOR.
EARL B. ATKINSON,
BY
Justin W. Macklin

Patented Jan. 13, 1953

2,625,357

UNITED STATES PATENT OFFICE 2,625,357

BAR HANGER ATTACHMENT

Earl B. Atkinson, Bay Village, Ohio

Application February 27, 1946, Serial No. 650,625

1 Claim. (Cl. 248—205)

This invention relates to bar hanger attachments for suspending electric light fixtures.

It is particularly concerned with the type of connection box of the flush type, and it has for its objects simplicity of manufacture and convenience in installation and security and durability in use.

Other more specific objects will become apparent in the following description which relates to the accompanying drawings and its essential characteristics are summarized in the appended claim.

In the drawings, Fig. 1 is a vertical section through the bar and connection box shown in my novel attaching means.

Figure 1:
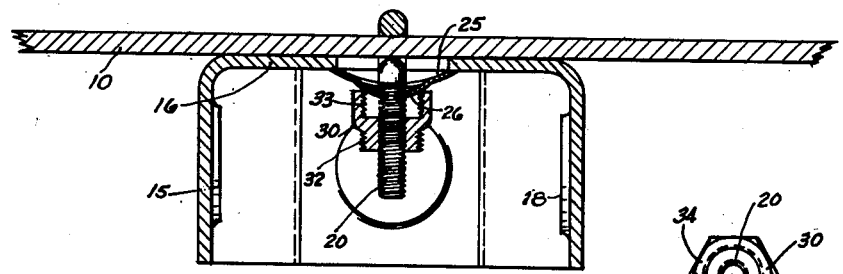

Describing the parts by the use of reference characters, 10 designates a hanger bar extending between the usual joist or floor beams not shown, having one or both ends so spaced as to permit the passing of the eye of the hanger bolt end over it, and which is normally positioned above the ceiling or surface level to allow for approximately the height of the connection box 15, which is here shown as the octagonal type and which may be provided with the usual knockout disks leaving openings for the conduits or lead wires.

Such a connection box is usually held suspended on the bar, and when the parts are assembled its bottom wall 16 rests against the under side of the bar 10 being held by nut and bolt attachments.

These attachments serve not only to hold the box rigidly in position, but also to receive a threaded connection for light fixtures and the like, and which must be sufficiently strong to suspend very heavy fixtures.

The building codes usually require capability of supporting a load of several hundred pounds on the member embracing the hanger bar.

The problem is raised therefore in providing a cheap convenient attaching means which is capable of assembly into position during completion of the wall or ceiling surface and which may, by simply fitting a thread connection, receive and support the light fixture.

It is desirable to be able to move the bolt and box longitudinally of the bar to obtain predetermined positions with relation to the joists and to hold the box firmly in position ready for attaching the light fixture after completion of the wall.

Figure 2:
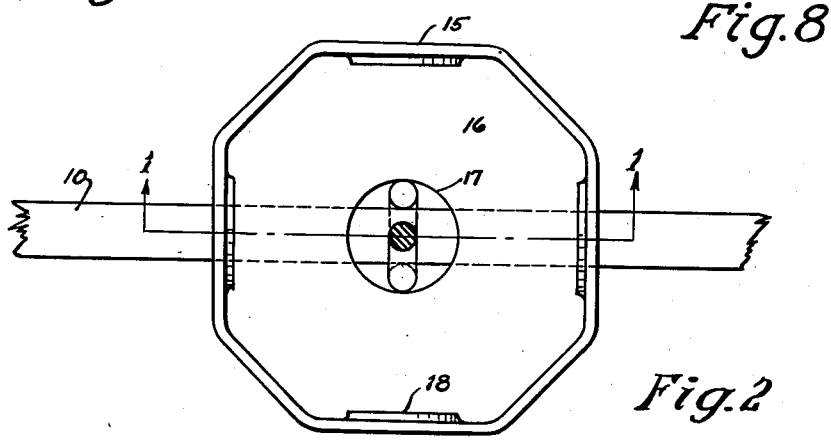
Fig. 2 is a bottom plan of the same with the securing nuts removed.
Figure 3:
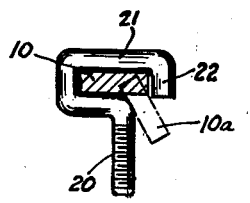
Fig. 3 is a detail of a preferred form of hanger bolt made of one piece and adapted to be slipped over the bar and shown in section.

A hanger bolt of a type capable of meeting these requirements and of being very cheaply manufactured is illustrated in Figs. 1 to 3. This bolt comprises a threaded shank 20 and a loop head 21 having a down-turned end 22 engaging one side of the bar but spaced away from the shank sufficiently to allow the bolt to be passed over the bar, as indicated in Fig. 3, where the broken lines 10a indicate the relative position of the bar and bolt while passing the head over the side of the bar. In use, the bolt head loop engages the bar as shown in solid lines in Fig. 3, as well as in Figs. 1 and 2.

The wall 16 of the box 15 is provided with an opening 17 which is of a standard size for the knockout openings 18 for such fixtures. The strength of the bar 10 requires a minimum of thickness and width which has become standard, and its width with relation to the diameter of the hole 17 forms definite limitation of space for an element passing through this hole and over the top of the bar. This limits size and strength of such a member and likewise restricts the possibilities of cheap construction and convenience in performing the assembly, and the final supporting functions are limited in capacity.

Building code requirements usually specify standard threads at 20 to be not less than three-sixteenths of an inch outside diameter, and the bar is one-half inch wide and three-sixteenths of an inch thick—or only slightly less in each of these dimensions.

The knockout opening 17 is standard at seven-eighths of an inch. Thus, it will be seen that the largest diameter rod which can pass over the sides of the bar 10 and through the opening, as shown in Figs. 1 and 2, is limited to about eleven-sixty fourths of an inch.

To make the bolt with the head, shown as in Figs. 1 to 3, I choose a wire of .162 inch plus or minus .002 inch and form the threads 20 by a rolling action which increases their outside diameter to a minimum requirement of three-sixteenths of an inch.

Figure 7:
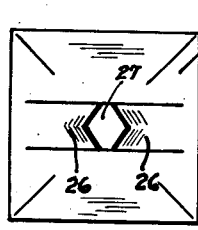
Fig. 7 is an enlarged detail of a spring nut.

Fitted over such a bolt is a spring nut, Fig. 7, preferably of the square type, and having its body portion 25 sufficiently large to close the opening 17. Its engaging wings or gripping members 26 are split therefrom in accordance with the usual practice in making such nuts, and the engaging edges 27 are adapted to be pressed down over the threads 20 until the body 25 engages the base 16 of the box 15. At this point the body of the spring nut may be given a partial turn to further tighten the same after the exact positioning of the box with relation to the joists. The usual nut or stud 30 may be then threaded into position.

I prefer to use a special form of stud provided with both male and female threads. For example, to receive three-eighths of an inch male or female fittings, it is only necessary to invert the nut or stud member for either type.

Figure 8:
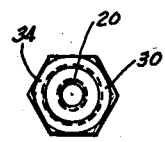
Fig. 8 is an end view of the stud nut used for locking the parts in assembled position.

Referring particularly to Figs. 1 and 8, the stud nut has threads fitting the threads 20 and external threads 32 and internal threads 33 while presenting a hexagonal or angular face to receive a wrench.

Figure 4:
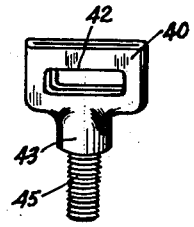
Fig. 4 is a perspective view of a modified form of hanger bolt.
Figure 5:
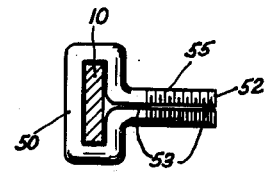
Fig. 5 is an elevation of still another form of hanger bolt.
Figure 6:
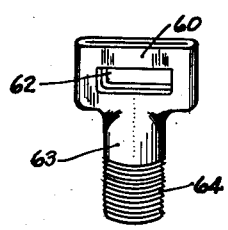
Fig. 6 is a perspective view of a hanger bolt for a female thread fitting.

Modifications of the hanger bolt which do not have the simplicity and convenience of hooking the bolt over the bar, but which meet other requirements—particularly those of greater suspending strength are illustrated in Figs. 4, 5 and 6.

Referring first to Fig. 4, the eye of the bolt is formed by flattening a tubular member to present a rectangular head 40 through which may be punched an oblong opening 42 of a size to slidably fit over the bar 10. An undeformed portion 43 of the tubular member may receive the upper end of a threaded shank 45 which may be secured in position as by welding it into the inside of the shank, and which may present full standard size of threads corresponding to the suspending threads 20.

In Fig. 5 is an eye bolt type formed of half-round wire having the eye or head 50 bent to embrace the bar 10, and having shank portions 52 brought together and welded as by spot welds indicated at 53 to present the two half-round surfaces for a substantially continuous thread, indicated at 55, corresponding to threads 20.

The form shown in Fig. 6 has less frequent use and may or may not be used with the spring nut such as 25. In this case the head 60 formed with a rectangular opening 62 is flattened from a tubular member presenting a shank 63 threaded as at 64 which may correspond to the threads 32 of the stud 30, or may receive the threads of special fittings where the three-sixteenths of an inch or other small diameters are insufficient.

From the foregoing description it will be seen that I have provided a bar hanger and outlet box construction which may be very conveniently assembled and may be positioned precisely as desired, and may be securely held in that position during the completion of the wall, ready for the fitting and hanging of the lighting or other fixture.

The spring nut is very easy to apply, and while it permits sliding the box along the bar, it holds it in any position given, and is further tightened and secured by the stud nut 30.

By forming the open head or hook bolt of the diameter which is the maximum allowed by the space within the openings 17 and over the bar 10 lying across the opening, and then rolling the threads on the shank, which literally expands the diameter of the threads beyond the surface diameter of the shank, the code requirements may be met, and the net result is a very cheap and convenient construction, while being very effective in use.

In instances where the hanger bolt may be slid on the bar, and may be required to have a little larger thread than possible to roll on the small wire stock used for the form of Figs. 1 to 3, the other forms may meet the requirement with a minimum of additional expense and inconvenience.

Having thus described my invention what I claim is:

An eyelet form of hanger bolt adapted to embrace a flat strip-like hanger bar for suspending ceiling type fixtures, including an outlet box having a standard knockout opening in the base through which the eyelet of the bolt may project and hold the outlet box flat against the bar, said bolt being formed of half-round material bent to present an intermediate flat straight portion engaging the upper flat surface of the bar and having portions extending downwardly over the side edges of the bar and through said knockout opening, and said bolt having its flat sides welded together adjacent the ends to present a substantially cylindrical shank and having threads formed on the shank, and a spring nut bridging the standard knockout opening in the top of the outlet box and engaging the inside of the top of the box, and said spring nut having tongues extending downwardly and engaging the threads formed on the shank of the bolt.

EARL B. ATKINSON.

REFERENCES CITED

The following references are of record in the file of this patent:

UNITED STATES PATENTS

| Number | Name | Date |
| --- | --- | --- |
| 1,182,351 | Cochrane | May 9, 1916 |
| 1,357,291 | Lindemar | Nov. 2, 1920 |
| 1,453,233 | Ball | Apr. 24, 1923 |
| 1,723,866 | Knoderer | Aug. 6, 1929 |
| 1,852,425 | Levene | Apr. 5, 1932 |
| 2,084,018 | Edwards | June 15, 1937 |
| 2,175,453 | Barcy | Oct. 10, 1939 |
| 2,230,916 | Tinnerman | Feb. 4, 1941 |
| 2,246,189 | Rugg et al. | June 17, 1941 |
| 2,260,829 | Carlson | Oct. 28, 1941 |
| 2,382,936 | Bedford | Aug. 14, 1945 |

FOREIGN PATENTS

| Number | Country | Date |
| --- | --- | --- |
| 13,822 | Great Britain | Nov. 12, 1885 |